United States Patent
Maruyama et al.

(10) Patent No.: US 8,928,291 B2
(45) Date of Patent: Jan. 6, 2015

(54) ELECTRIC ROTARY MACHINE FOR MOTOR VEHICLE

(71) Applicant: Denso Corporation, Kariya, Aichi-pref. (JP)

(72) Inventors: Toshinori Maruyama, Anjo (JP); Masaya Nakanishi, Toyohashi (JP); Asaka Kimura, Kariya (JP); Takatoshi Inokuchi, Kariya (JP)

(73) Assignee: Denso Corporation, Kariya (JP)

( * ) Notice: Subject to any disclaimer, the term of this patent is extended or adjusted under 35 U.S.C. 154(b) by 3 days.

(21) Appl. No.: 13/933,729

(22) Filed: Jul. 2, 2013

(65) Prior Publication Data

US 2014/0042990 A1  Feb. 13, 2014

(30) Foreign Application Priority Data

Aug. 10, 2012  (JP) ................................. 2012-178028

(51) Int. Cl.
  *H02P 11/00*  (2006.01)
(52) U.S. Cl.
  USPC .............................................. 322/23; 322/45
(58) Field of Classification Search
  USPC .................... 322/22, 23, 24, 28, 45
  See application file for complete search history.

(56) References Cited

U.S. PATENT DOCUMENTS 5,748,463 A   5/1998  Tsutsui et al.
7,221,127 B2  5/2007  Masson et al.
7,973,517 B2  7/2011  Nakajima et al.
8,541,988 B2 *  9/2013  Horihata et al. ................. 322/21
8,547,071 B2 * 10/2013  Horihata et al. ................. 322/21

(Continued)

FOREIGN PATENT DOCUMENTS

JP  A-9-219938      8/1997
JP  A-2003-244864   8/2003

(Continued)

OTHER PUBLICATIONS

Jun. 24, 2014 Office Action issued in Japanese Application 2012-178028 (with partial English translation).

*Primary Examiner* — Nicholas Ponomarenko
(74) *Attorney, Agent, or Firm* — Oliff PLC (57) ABSTRACT

An alternator has rectifying module groups. The rectifying module groups form a bridge circuit. The rectifying module groups have a load dump protection judgment section for monitoring an output voltage of rectifying module groups. When the monitored output voltage exceeds a first threshold voltage, the load dump protection judgment section provides to a control section an instruction to turn on MOS transistors in a lower arm of the bridge circuit at a time when a predetermined delay time has elapsed. When a second threshold voltage is lower than the first threshold voltage and the monitored output voltage becomes less than the second threshold voltage after the monitored output voltage exceeds the first threshold voltage, the load dump protection judgment section provides to the control circuit an instruction to turn on the MOS transistors in the lower arm after the MOS transistors are turned off during a predetermined time length.

13 Claims, 9 Drawing Sheets

(56) References Cited

U.S. PATENT DOCUMENTS

| | | | |
|---|---|---|---|
| 8,570,004 B2 * | 10/2013 | Asada et al. | 322/45 |
| 8,710,807 B2 * | 4/2014 | Horihata et al. | 322/33 |
| 8,716,966 B2 * | 5/2014 | Nakayama et al. | 318/400.06 |
| 8,716,983 B2 * | 5/2014 | Horihata | 322/23 |
| 2005/0017694 A1 | 1/2005 | Masson et al. | |
| 2005/0258690 A1 | 11/2005 | Kusumi | |
| 2006/0087181 A1 | 4/2006 | Kusumi | |
| 2007/0278966 A1 | 12/2007 | Chemin et al. | |
| 2011/0074364 A1 | 3/2011 | Nakajima et al. | |
| 2012/0001598 A1 | 1/2012 | Horihata et al. | |
| 2012/0007568 A1 * | 1/2012 | Horihata et al. | 322/21 |
| 2014/0055894 A1 * | 2/2014 | Maruyama et al. | 361/56 |

FOREIGN PATENT DOCUMENTS

| | | |
|---|---|---|
| JP | A-2004-153887 | 5/2004 |
| JP | A-2005-506028 | 2/2005 |
| JP | A-2008-512077 | 4/2008 |
| JP | A-2011-78216 | 4/2011 |
| JP | A-2012-16158 | 1/2012 |
| JP | A-2012-120293 | 6/2012 |

\* cited by examiner

ELECTRIC ROTARY MACHINE FOR MOTOR VEHICLE

CROSS-REFERENCE TO RELATED APPLICATION

This application is related to and claims priority from Japanese Patent Application No. 2012-178028 filed on Aug. 10, 2012, the contents of which are hereby incorporated by reference.

BACKGROUND OF THE INVENTION

1. Field of the Invention

The present invention relates to electric rotary machines or alternators to be mounted to motor vehicles such as passenger vehicles and trucks.

2. Description of the Related Art

An alternator mounted to a motor vehicle generates electric power by a driving force transmitted from an internal combustion engine of the motor vehicle. Output terminals of the alternator are connected to terminals of a battery mounted to the motor vehicle through charging wires. The alternator supplies the generated electric power to the battery through the charging wires. The alternator further supplies the generated electric power to various electrical loads mounted to the motor vehicle through other wires. When the charging wires are disconnected from the output terminals of the alternator or the terminals of the battery while the alternator is running, i.e. during the electric power generation, a highly transient voltage is generated. Such a transient voltage is called as a load dump. When the disconnection of the charging wires occurs, the generated highly transit voltage as the load dump reaches 100 volts, for example. As a result, the electrical loads mounted to the motor vehicle and various components in the alternator are often damaged by generated load dump surges. In order to protect the electrical loads and various components in the alternator from such a highly transient voltage, it is necessary to have a countermeasure against the load dump surges.

In order to solve such a problem, conventional techniques have disclosed various types of load dump protection devices. For example, Japanese patent laid open publication number JP H09-219938 discloses an alternator for a motor vehicle in which a lower arm of a bridge circuit in a rectifying section for the alternator is composed of MOS transistors as switching elements. The MOS transistors are turned on simultaneously when a load dump occurs and an output voltage of the alternator exceeds a reference voltage. This makes it possible to execute a load dump protection operation which suppresses the generation of a highly output voltage in the alternator when a load dump occurs. However, in the structure of the conventional alternator disclosed in JP H09-219938, when the output voltage of the alternator decreases to not more than the reference voltage after the MOS transistors as the switching elements in the lower arm of the bridge circuit are turned on, each of the MOS transistors in the lower arm of the bridge circuit is turned off again in order to re-execute a usual rectifying operation.

By the way, in the structure of the conventional alternator disclosed in JP H09-219938 as previously described, there is a delay time counted from a time when an actual output voltage of the alternator exceeds the reference voltage to a time when the load dump protection device executes the load dump protection operation. In addition, it is also necessary to have a low pass filter in order to eliminate noise and prevent the load dump protection device from executing incorrect operation caused by noise. Still further, it is necessary to consider a response time of an internal circuit components in the alternator in addition to the above delay time. During the delay time until the MOS transistors are turned on, the energy stored in the stator of the alternator is outputted to the output terminals of the alternator, and this outputted energy suddenly increases a terminal voltage of a capacitance which is used for eliminating noise. As a result, the MOS transistors in the bridge circuit and the internal circuit are damaged by the increased terminal voltage of the alternator. This decreases the reliability of the alternator. After the MOS transistors in the bridge circuit is turned on during the load dump protection operation, because the outputted energy supplied from the stator is prohibited and the control circuit of the MOS transistors and a control circuit of the alternator consume the output voltage of the alternator, the load dump protection circuit stops the execution of the load dump protection operation when the output voltage of the alternator decreases to not more than a predetermined voltage. The execution of the load dump protection operation and the stop of the load dump protection operation are repeated until the energy stored in the stator is consumed. However, when the capacitor connected to the output terminal of the alternator has a small capacitance, the number of repetitions to repeatedly execute the load dump protection operation and stop the load dump protection operation increases, a power loss is accordingly accumulated. As a result, there is a possibility of damaging the MOS transistors in the bridge circuit. In particular, such occurrence of damage extremely increases when the charging wires are disconnected from the output terminals of the alternator. Accordingly, there is a strong demand for the alternator to have a countermeasure device capable of protecting the MOS transistors as switching elements in the bridge circuit from being damaged when a load dump occurs.

SUMMARY

It is therefore desired to provide an alternator for a motor vehicle capable of quickly preventing a high voltage generation in the alternator when a load dump occurs in the alternator.

An exemplary embodiment provides an electric rotary machine comprised of armature windings as stator windings, switching sections as rectifying module groups, and a field control section. The field control section has a capacitor. The armature windings have not less than two phase windings. The switching sections form a bridge circuit. The bridge circuit is comprised of an upper arm and a lower arm. The lower arm is comprised of switching elements. Each of the switching elements in the lower arm is connected in parallel to a diode. The switching sections receive and rectify a voltage induced by the armature windings. The capacitor in the field control section is connected in parallel to an output terminal of the switching sections. The switching sections are comprised of a control section and a load dump protection judgment section. The control section controls a turn-on operation and a turn-off operation of each of the switching elements. The load dump protection judgment section executes a load dump protection operation by monitoring an output voltage of the switching sections, instructing the control section to turn on the switching elements in the lower arm at a time when a predetermined delay time has elapsed from when the monitored output voltage of the switching sections exceeds a first threshold voltage, and instructing the control section to turn on the switching elements in the lower arm after the switching elements in the lower arm are turned off during a predetermined time length, when the monitored output voltage of the switching sections becomes less than a second threshold voltage after the monitored output voltage of the switching sections exceeds the first threshold voltage.

Because the control section uses the predetermined time length during which the switching elements in the lower arm of the bridge circuit in the switching sections are turned off when the monitored output voltage of the switching sections exceeds the first threshold voltage during the load dump protection operation, it is possible to decrease the increased amount of the output voltage of the switching sections by adjusting the predetermine time length to an optimum time length. This makes it possible to promptly prevent the output voltage from increasing when the load dump occurs. This makes it possible to prevent supplying a high voltage to the switching elements for a long time and possible to increase the reliability of the rectifying operation executed by the switching elements in the switching sections for a long time of period.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Hereinafter, various embodiments of the present invention will be described with reference to the accompanying drawings. In the following description of the various embodiments, like reference characters or numerals designate like or equivalent component parts throughout the several diagrams.

Exemplary Embodiment

A description will be given of an alternator 1 as an electric rotary machine to be used in motor vehicles according to an exemplary embodiment with reference to FIG. 1 to FIG. 10.

Figure 1:
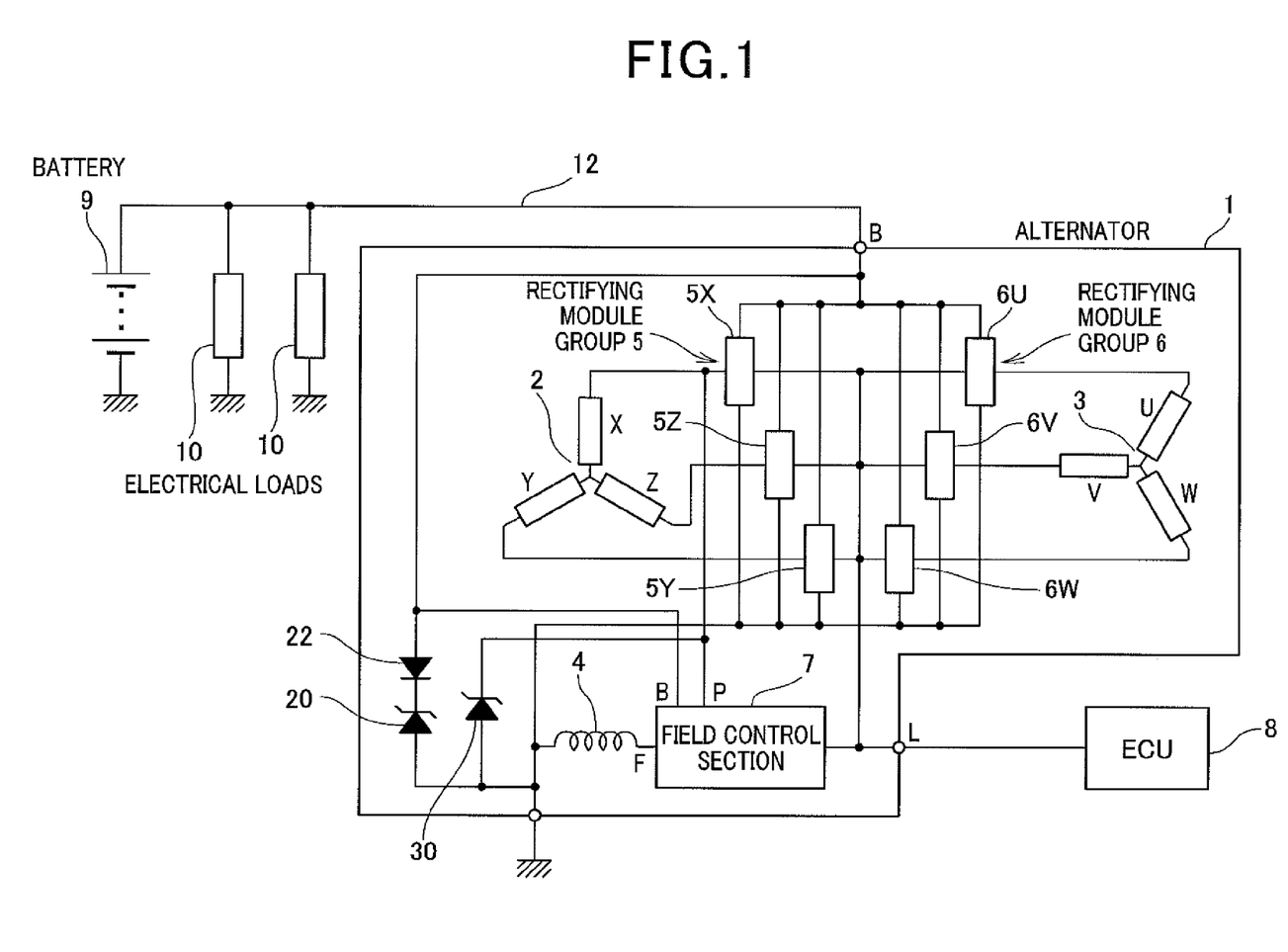
FIG. 1 is a view showing a structure of an alternator to be used in motor vehicles according to an exemplary embodiment of the present invention.

FIG. 1 is a view showing a structure of the alternator 1 for motor vehicles according to an exemplary embodiment. As shown in FIG. 1, the alternator 1 is comprised of two stator windings (or armature windings) 2 and 3 and a field winding 4, two rectifying module groups 5 and 6, a field control section 7, Zener diodes 20 and 30, and a diode 22 (as a current limiting element). The Zener diode 20 corresponds to the first Zener diode used in the claims. The diode 22 corresponds to the current limiting element used in the claims. The two rectifying module groups 5 and 6 correspond to switching sections, respectively.

The stator winding 2, as one of the stator windings, is a multi-phase winding, for example which is comprised of a X phase winding, a Y phase winding and a Z phase winding. The stator winding 2 is wound around a stator core (not shown). Similarly, the stator winding 3 is a multi-phase winding, for example comprised of a U phase winding, a V phase winding and a W phase winding. The stator winding 3 is wound around the stator core at a position which is delayed by electrical angle of 30°. The stator in the alternator 1 according to the exemplary embodiment is comprised of the stator windings 2 and 3 and the stator core.

The field winding 4 is wound on field poles (not shown). The field poles are arranged faced to an inner circumferential side of the stator core. The field winding 4 forms a rotor. When a field current is supplied to the field winding 4, the field winding 4 is magnetized. When field winding 4 is magnetized, a rotary magnetic field is generated in the field winding 4 in the rotor, and the stator windings 2 and 3 generate alternating current (AC) field by the rotary magnetic field.

On the other hand, the rectifying module group 5, which is one of the two rectifying module groups 5 and 6, is connected to the stator winding 2 to form a three phase full wave rectifying circuit (or a bridge circuit). The rectifying module group 5 converts an alternating current induced in the stator winding 2 to a direct current. The rectifying module group 5 is comprised of rectifying modules 5X, 5Y and 5Z which correspond to the phases of the stator winding 2. The number of the rectifying modules in the rectifying module group 5 corresponds to the number of the phases of the stator winding 2. For example, when the stator winding 2 is a three phase winding, the number of the rectifying modules in the rectifying module group 5 is three. For example, when the stator winding 2 is a two phase winding, the number of the rectifying modules in the rectifying module group 5 is two.

The rectifying module 5X is connected to the X phase winding in the stator winding 2. The rectifying module 5Y is connected to the Y phase winding in the stator winding 2. The rectifying module 5Z is connected to the Z phase winding in the stator winding 2.

On the other hand, the rectifying module group 6 is connected to the stator winding 3 to form a three phase full wave rectifying circuit (or a bridge circuit). The rectifying module group 6 converts an alternating current induced in the stator winding 3 to a direct current. The rectifying module group 6 is comprised of rectifying modules 6U, 6V and 6Z which correspond to the phases of the stator winding 3. The number of the rectifying modules in the rectifying module group 6 corresponds to the number of the phases of the stator winding 3. For example, when the stator winding 3 is a three phase winding, the number of the rectifying modules in the rectifying module group 6 is three, and when the stator winding 3 is a two phase winding, the number of the rectifying modules in the rectifying module group 6 is two.

The rectifying module 6U is connected to the U phase winding in the stator winding 3. The rectifying module 6V is connected to the V phase winding in the stator winding 3. The rectifying module 6W is connected to the W phase winding in the stator winding 3.

A terminal F of the field control circuit 7 is connected to the field winding 4. The field control circuit 7 adjusts a field current to be supplied to the field winding 4 on the basis of the output voltage of the rectifying module groups 5 and 6 so that the output voltage $V_B$ (as an output voltage of each rectifying module) in the alternator 1 becomes equal to an adjustment voltage $V_{reg}$. For example, the field control circuit 7 prohibits the supply of the field current to the field winding 4 when the output voltage $V_B$ becomes not less than the adjustment voltage $V_{reg}$. On the other hand, the field control circuit 7 allows the supply of the field current to the field winding 4 when the output voltage $V_B$ becomes less than the adjustment voltage $V_{reg}$.

A terminal P of the field control circuit 7 is connected to the stator winding. The field control circuit 7 detects a rotation speed of the rotor on the basis of one of the phase voltages (for example, the phase voltage of the X phase) which is provided to the terminal P of the field control circuit 7.

When detecting that the rotor stops, the field control circuit 7 decreases the field current to be supplied to the field winding 4. Specifically, the field control circuit 7 adjusts the field current to a value, for example, approximately 2 A.

Further, the field control circuit 7 is connected to an external control device as an electrical control unit (ECU) 8 through a communication terminal L and a communication line. In order to transmit data, the field control circuit 7 and the ECU 8 can execute a local interconnect network (LIN) communication as a bidirectional serial communication by using a local interconnect network (LIN) protocol.

The Zener diode 20 is connected in parallel to the output terminals of the rectifying module groups 5 and 6. Specifically, an output terminal of the alternator 1 is connected to a cathode terminal of the Zener diode 20, and a ground terminal of the alternator 1 is connected to an anode terminal of the Zener diode 20. The Zener diode 20 is connected in series to the diode 22. The diode 22 acts as a current limiting element capable of prohibiting a current when the output terminal of the alternator 1 is connected in reverse to a battery 9. The direction to limit the current is a direction when the anode terminal of the diode 22 is connected to the output terminal of the alternator 1.

In the structure shown in FIG. 1, although the diode 22 is connected to the output terminal side of the alternator 1, it is possible to have a structure in which the Zener diode 20 is connected to the output terminal side of the alternator 1. That is, it is possible to replace so the diode 22 in position with the Zener diode 20.

The Zener diode 30 is connected between the ground terminal and the terminal P of the field control circuit 7 so that the terminal P of the field control circuit 7 is connected to cathode terminal of the Zener diode 30.

The arrangement of the Zener diode 30 makes it possible to have a structure in which a switching element in a low arm side of the bridge circuit and the Zener diode 22 are connected in parallel, where this switching element corresponds to one phase winding (for example, X phase winding) in the stator winding connected to the terminal P of the field control circuit 7.

The Zener diode 20 and the Zener diode 30 have a Zener voltage which is lower than a withstand voltage of the switching element and a withstand voltage of the field control circuit 7. The Zener diode 20 corresponds to the first Zener diode used in the claims and the Zener diode 30 corresponds to the second Zener diode used in the claims.

Figure 2:
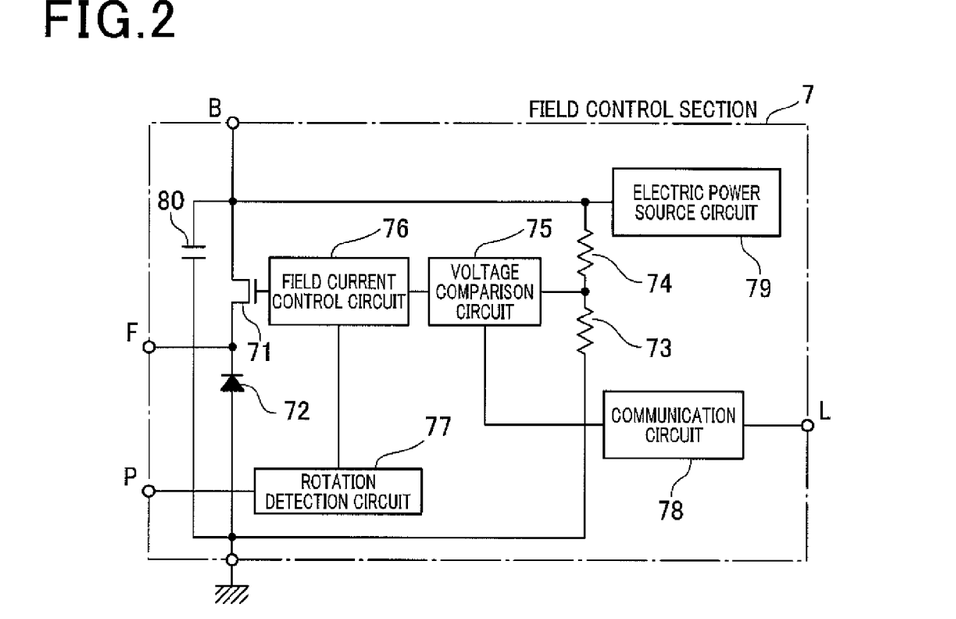
FIG. 2 is a view showing a detailed structure of a field control section in the alternator according to the exemplary embodiment of the present invention.

FIG. 2 is a view showing a detailed structure of the field control section 7 in the alternator 1 according to the exemplary embodiment.

As shown in FIG. 2, the field control circuit 7 is comprised of a MOS transistor 71, a freewheeling diode 72, resistances 73 and 74, a voltage comparison circuit 75, a field current control circuit 76, a rotation detection circuit 77, a communication circuit 78, an electric power circuit 79 and a capacitor 80. The field control circuit 7 communicates with the ECU 8 through the communication circuit 78. For example, the field control circuit 7 can receive data such as an adjustment voltage $V_{reg}$ transmitted from the ECU 8.

The resistances 73 and 74 form a voltage divider circuit. The voltage divider circuit divides the voltage generated by the alternator 1, and outputs the divided voltage to the voltage comparison circuit 75.

The voltage comparison circuit 75 compares the divided voltage supplied from the voltage divider circuit comprised of the resistances 73 and 74 with the adjustment voltage $V_{reg}$ transmitted from the ECU 8 through the communication circuit 78. For example, when the comparison result indicates that the adjustment voltage $V_{reg}$ is higher than the divided voltage, the voltage comparison circuit 75 generates and outputs a high voltage level signal. On the other hand, when the comparison result indicates that the divided voltage is higher than the adjustment voltage $V_{reg}$, the voltage comparison circuit 75 generates and outputs a low voltage level signal.

The field current control circuit 76 instructs the MOS transistor 71 to turn on and turn off on the basis of a pulse width modulation (PWM) signal. The PMW signal has a drive duty determined on the basis of the output (which corresponds to the comparison result) of the voltage comparison circuit 75. In order to suppress a rapid change of an output current, it is possible for the field current control circuit 76 to gradually change the field current.

The rotation detection circuit 77 is connected to the X phase winding of the stator winding 2 through the terminal P. The rotation detection circuit 77 detects a rotation of the rotor on the basis of the phase voltage $V_P$ at the end of the X phase winding. Specifically, the rotation detection circuit 77 detects the rotation of the rotor on the basis of a periodical change of a difference between the phase voltage and the reference voltage for the rotation detection.

Because the phase voltage $V_P$ is outputted at the P terminal of the field control circuit 7 during a normal operation in which no failure occurs in the rectifying module 5X and the stator winding 2, it is possible for the field current control circuit 76 to detect the rotation of the rotor on the basis of the phase voltage $V_P$.

The field current control circuit 76 inputs the rotation detection result transmitted from the rotation detection circuit 77. The field current control circuit 76 generates and outputs a PWM signal in order to supply a field current necessary to the field winding 4 during the rotation detection operation executed by the rotation detection circuit 77. However, when the stop state of the rotation of the rotor is continued during a time length of not less than a predetermined time length (or a predetermined period), the field current control circuit 76 generates and outputs a necessary PWM signal so that the field current has a value corresponding to an initial excited state.

The electric power circuit 79 supplies an operation voltage to each of the circuits in the field control circuit 7. Noise often enters through the output terminals of the rectifying module groups 5 and 6. The capacitor 8 eliminates this noise. The capacitor 8 has a capacitance of approximately 1 µF, for example.

Figure 3:
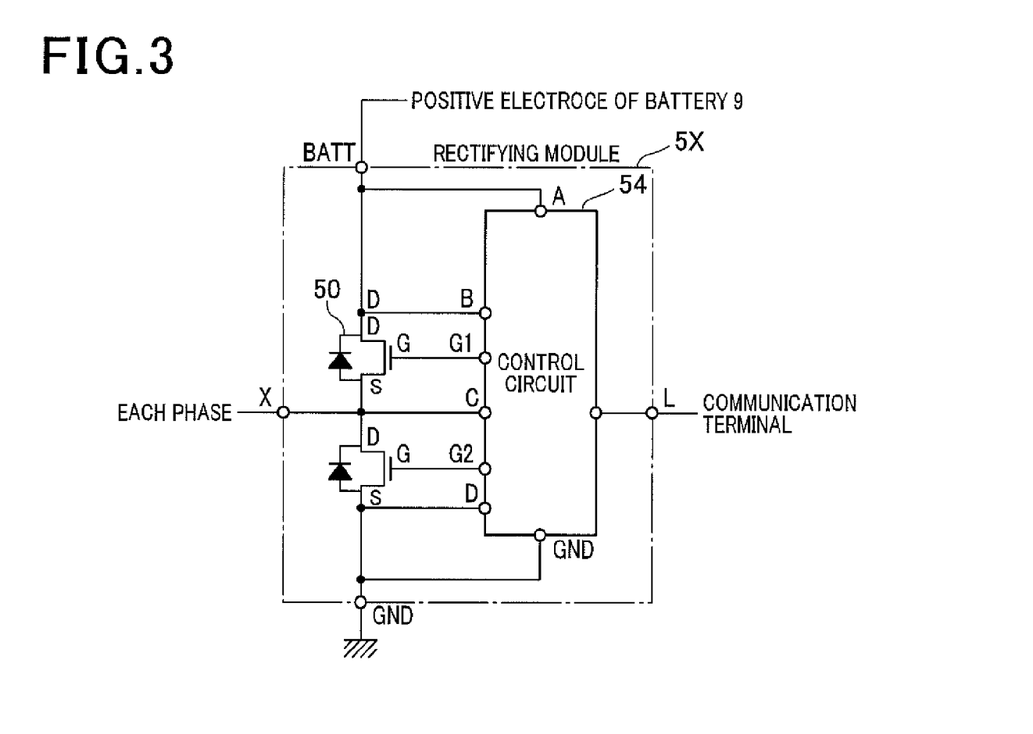
FIG. 3 is a view showing a structure of a rectifying module in the alternator according to the exemplary embodiment of the present invention.

The alternator 1 according to the exemplary embodiment has the structure previously described. A description will now be given of the detailed structure of the rectifying module 5X, etc. Because the rectifying modules 5X, 5Y, 5Z, 6U, 6V and 6W have the same structure, the structure of the rectifying module 5X will be explained.

FIG. 3 is a view showing a structure of a rectifying module 5X in the alternator 1 according to the exemplary embodiment. As shown in FIG. 3, the rectifying module 5X is comprised of two MOS transistors 50 and 51 and a control circuit 54. A source terminal of the MOS transistor 50 is connected to the X phase winding of the stator winding 2. A drain terminal of the MOS transistor 50 is connected to electrical loads and a positive terminal of the battery 9 through the charging line 12. That is, the MOS transistor 50 is a switching element belongs to the upper arm (upper side) of the bridge circuit.

A drain terminal of the MOS transistor 51 is connected to the X phase winding of the stator winding 2. A source terminal of the MOS transistor 51 is connected to a negative terminal (or earth) of the battery 9. That is, the MOS transistor 51 is a switching element belongs to the lower arm (lower side) of the bridge circuit.

A diode is connected in parallel to each of the MOS transistors 50 and 51. That is, the diode is connected between the source terminal and the drain terminal of each of the MOS transistors 50 and 51. This diode is a parasitic diode (or a body diode). It is also possible to arrange another diode in parallel to each of the MOs transistors 50 and 51. Still further, it is possible that at least one of the upper arm and the lower arm is comprised of switching elements other than MOS transistors.

Figure 4:
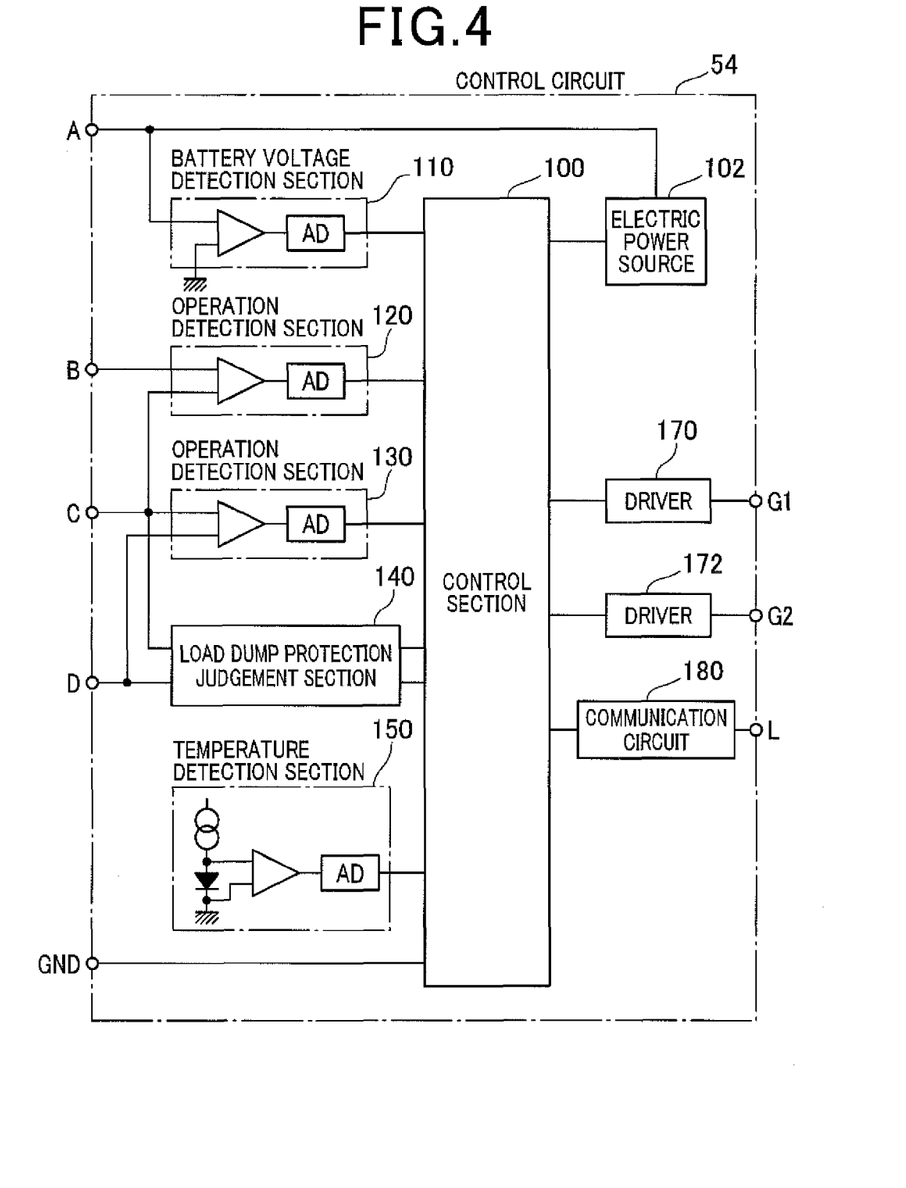
FIG. 4 is a view showing a detailed structure of a control circuit in the rectifying module in the alternator according to the exemplary embodiment of the present invention.

FIG. 4 is a view a detailed structure of the control circuit 54 in the rectifying module 5X in the alternator according to the exemplary embodiment. As shown in FIG. 4, the control circuit 5 is comprised of a control section 100, an electric power source 102, a battery voltage detection section 110, operation detection sections 120 and 130, a load dump protection judgment section 140, a temperature detection section 150, a driver 170, a driver 172, and a communication circuit 180.

The electric power source 102 starts to operate when a predetermined voltage is generated at the X phase winding of the stator winding 2 after an internal combustion engine (not shown) starts to combustion. The electric power source 102 supplies electric power to each of the components in the control circuit 54. The control circuit 54 executes the same operation which is identical with the operation of a control circuit in a conventional alternator.

An output terminal (G1) of the driver 170 is connected to a gate terminal of the MOS transistor 50 in the high voltage side (the upper arm). The driver 170 generates and outputs a drive signal in order to turn on and off the MOS transistor 50. Similarly, the output terminal (G2) of the driver 172 is connected to a gate terminal of the MOS transistor 51 in the low voltage side (the lower arm). The driver 172 generates and outputs a drive signal in order to turn on and off the MOS transistor 51.

The battery voltage detection section 110 is comprised of a differential amplifier and an analogue to digital (AD) converter unit which converts an analogue output of this differential amplifier to digital data. The battery voltage detection section 110 outputs data which corresponds to a voltage at the positive terminal of the battery 9. The battery 9 is connected to the output terminal of the alternator 1 through the charging line 12.

The operation detection section 120 is comprised of a differential amplifier and an analogue to digital (AD) converter unit which converts an analogue output of this differential amplifier to digital data. The operation detection section 120 outputs data which corresponds to a voltage between the source terminal and the drain terminal of the MOS transistor 50 in the high voltage side (as the voltage between the terminals B and the terminal C shown in FIG. 3 and FIG. 4). On the basis of the data transmitted from the operation detection section 120, the control section 100 monitors the operation condition of each of the MOS transistor 50, controls the operation of the MOS transistor 50 and detects a failure of the MOS transistor 50. The operation state of the MOS transistor 50 corresponds to the operation state of the driver 170.

The operation detection section 130 is comprised of a differential amplifier and an analogue to digital (AD) converter unit which converts an analogue output of this differential amplifier to digital data. The operation detection section 130 outputs data which corresponds to a voltage between the source terminal and the drain terminal of the MOS transistor 51 in the low voltage side (as the voltage between the terminals C and the terminal D shown in FIG. 3 and FIG. 4). On the basis of the data transmitted from the operation detection section 130, the control section 100 monitors the operation condition of each of the MOS transistor 51, controls the operation of the MOS transistor 51 and detects a failure of the MOS transistor 51. The operation state of the MOS transistor 51 corresponds to the operation state of the driver 172.

The load dump protection judgment section 140 monitors the output voltage at the terminal B of the alternator 1 (or the rectifying module groups 5 and 6), and generates and outputs an instruct signal in order to execute the load dump protection operation when the output voltage at the terminal B exceeds the first threshold voltage V1 (for example, 20 V), where a load dump phenomenon is detected on the basis of the first threshold voltage V1. After the execution of the load dump protection operation, the load dump protection judgment section 140 generates and outputs an instruction signal in order to stop the load dump protection operation when the output voltage at the terminal B becomes less than a second threshold voltage V2 8for example, 16.5 V) which is lower than the first threshold voltage V1.

On the basis of the instruction signal transmitted from the load dump protection judgment section 140, the control section 100 promptly executes the load dump protection operation, and executes the rectifying operation after the load dump protection operation is released. The detailed explanation regarding the structure of the load dump protection judgment section 140 and the load dump protection operation will be described later.

The temperature detection section 150 is comprised of a constant power source, a diode, a differential amplifier and an analogue to digital (AD) converter. The AD converter converts an analogue output of the differential amplifier to digital data. The temperature detection section 150 generates and outputs data corresponding to a forward voltage drop of this diode. The forward voltage drop of the diode varies according to an ambient temperature change.

The communication circuit 180 has the same function of the communication circuit 78 for the field control section 7. The communication circuit 180 is connected to the communication terminal L and a communication line between the field control section 7 and the ECU 8. The communication circuit 180 executes a serial communication (or LIN communication) to the ECU 8 by using a LIN protocol.

Next, a description will now be given of the load dump protection operation by the load dump protection judgment section 140 with reference to FIG. 5.

Figure 5:
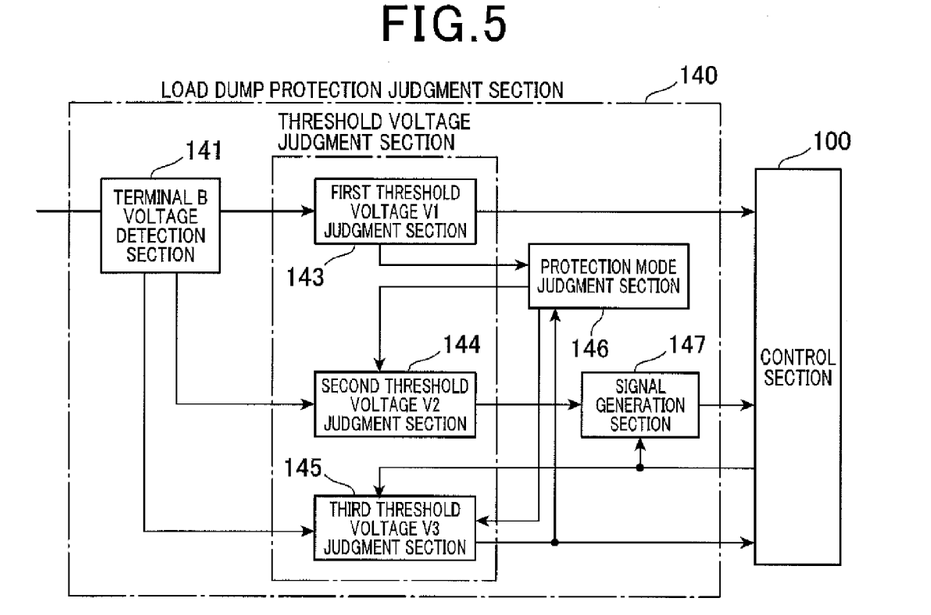
FIG. 5 is a view showing a detailed structure of a load dump protection judgment section in the control circuit in the alternator according to the exemplary embodiment of the present invention.

FIG. 5 is a view showing a detailed structure of the load dump protection judgment section 140 in the control circuit 54 in the alternator 1 according to the exemplary embodiment. As shown in FIG. 5, the load dump protection judgment section 140 is comprised of a terminal B voltage detection section 141, a threshold voltage judgment section 142, a protection mode judgment section 146, and a signal generation section 147.

The terminal B voltage detection section 141 detects an output voltage VB (the voltage at the terminal B) of the alternator 1 (or the rectifying module groups 5 and 6). The threshold voltage judgment section 142 compares the output voltage VB detected by the voltage detection section 141 with each of first, second and third threshold voltages V1, V2 and V3, and outputs a comparison result. The threshold voltage judgment section 142 is comprised of the first threshold voltage V1 judgment section 143, a second threshold voltage V2 judgment section 144 and a third threshold voltage V3 judgment section 145.

The first threshold voltage V1 detection section 143 compares the output voltage VB with the first threshold voltage V1. When the comparison result indicates VB>V1, the first threshold voltage V1 detection section 143 generates and outputs a signal regarding the comparison result (for example, a high voltage level signal). The first threshold voltage V1 is used for detecting occurrence of load dump phenomenon which is generated when the output terminal of the alternator 1 is disconnected from the output terminal 12, and the output voltage VB is suddenly increased. For example, when the battery 9 is a lead acid battery having a rated voltage of 12 V, the first threshold voltage V1 is 20 V.

The control section 100 receives the output signal transmitted from the first threshold voltage V1 judgment section 143. When the load dump phenomenon occurs, i.e. when the output signal transmitted from the first threshold voltage V1 judgment section 143 is changed from a low voltage level to a high voltage level, the control section 100 instructs the driver 170 to turn off the MOS transistor 50 in the high voltage side, and instructs the driver 180 to turn on the MOS transistor 51 in the low voltage side. This makes it possible to start the load dump protection operation and decrease the output voltage VB which is higher than the first threshold voltage V1.

The second threshold voltage V2 detection section 144 compares the output voltage VB with the second threshold voltage V2. When the comparison result indicates VB<V2, the second threshold voltage V2 detection section 144 generates and outputs a signal regarding the comparison result (for example, a high voltage level signal). The second threshold voltage V2 is used for detecting that the output voltage VB is decreased after the load dump protection operation is initiated. For example, the second threshold voltage V2 is 16.5 V which is lower than the first threshold voltage V1 (=20 V).

The signal generation section 147 receives the output signal transmitted from the second threshold voltage V2 judgment section 144. When receiving information indicating that the output signal transmitted from the second threshold voltage V2 judgment section 144 is switched from a low voltage level to a high voltage level and the output voltage VB becomes lower than the second threshold voltage V2, the signal generation section 147 generates and outputs a pulse signal which has a high voltage level during a predetermined time length. The control section 100 receives the pulse signal transmitted from the signal generation section 147 which prohibits the execution of the load dump protection operation during the high voltage level of the received pulse signal. That is, the control section 100 instructs the driver 172 to turn off the MOS transistor 51 in the low voltage side during the predetermined time length (and, maintains the turned-off state of the MOS transistor 50 in the high voltage side). After the elapse of the predetermined time length, the control section 100 instructs the driver 172 to turn on the MOS transistor 51 in the low voltage side. The method of generating the pulse signal of a high voltage level during the predetermined time length will be explained later.

The third threshold voltage V3 detection section 145 compares the output voltage VB with the third threshold voltage V3. When the comparison result indicates VB<V3, the third threshold voltage V3 detection section 145 generates and outputs a signal regarding the comparison result (for example, a high voltage level signal). The third threshold voltage V3 is used for detecting a time when the load dump protection operation is completed. The third threshold voltage V3 judgment section 145 executes the voltage comparison operation on the basis of the output voltage VB detected immediately after the control section 100 instructs the driver 172 to turn off the MOS transistor 51 during the predetermined tile length in response to the pulse signal transmitted from the signal generation section 147. The control section 100 informs to the third threshold voltage V3 judgment section 145 the timing immediately after the completion of the turned-off state of the MOS transistor 51 during the predetermined time length. When receiving this timing transmitted from the control section 100, the third threshold voltage V3 judgment section 145 starts the voltage comparison operation, i.e. compares the output voltage VB with the third threshold voltage V3.

The protection mode judgment section 146 judges whether or not the load dump protection operation is executed. Specifically, when the level of the output signal is switched from a low voltage level to a high voltage level, the protection mode judgment section 146 judges the start to execute the load dump protection operation. The protection mode judgment section 146 transmits the judgment result to the third threshold voltage V3 judgment section 145. When the level of the output signal of the third threshold voltage V3 judgment section 145 is switched from a low voltage level to a high voltage level, the protection mode judgment section 146 detects that execution of the load dump protection operation is completed.

The third threshold voltage V3 is less than the first threshold voltage V1 and not less than the second threshold voltage V2. It is possible for the third threshold voltage V3 and the second threshold voltage V2 to have the same voltage level. This case makes it possible to use the third threshold voltage V3 judgment section 145 as the second threshold voltage V2 judgment section 144, or to use the second threshold voltage V2 judgment section 144 as the third threshold voltage V3 judgment section 145. It is accordingly possible for the alternator 1 according to the exemplary embodiment to have a simple structure.

Figure 6:
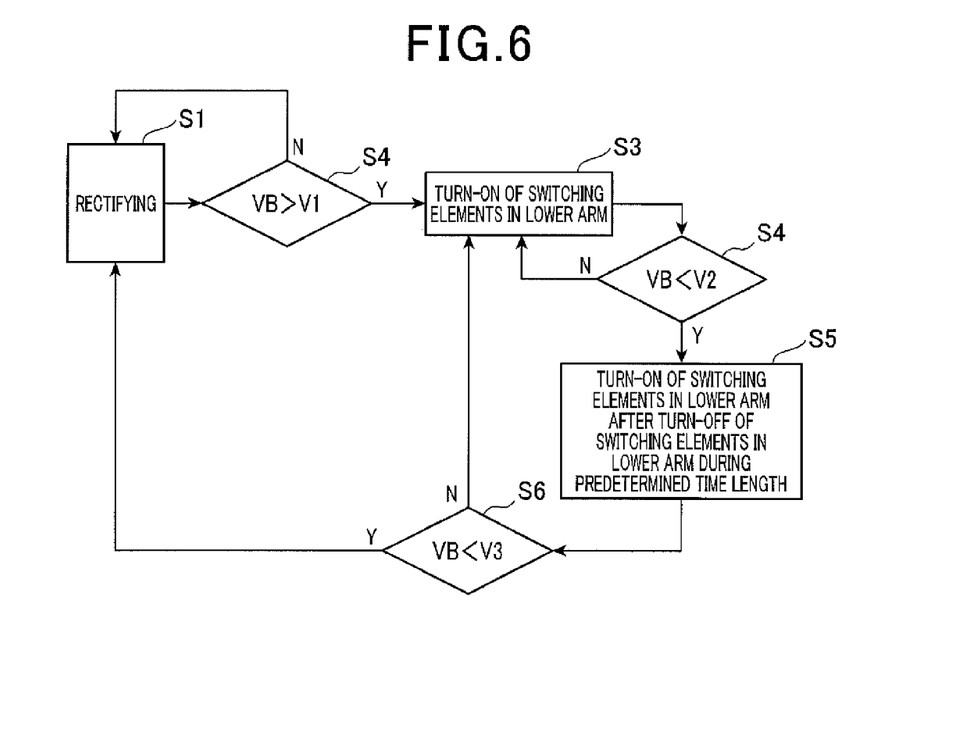
FIG. 6 is a view showing a transition state from a time when a load dump occurs to a time when a usual rectifying operation is executed.
Figure 7:
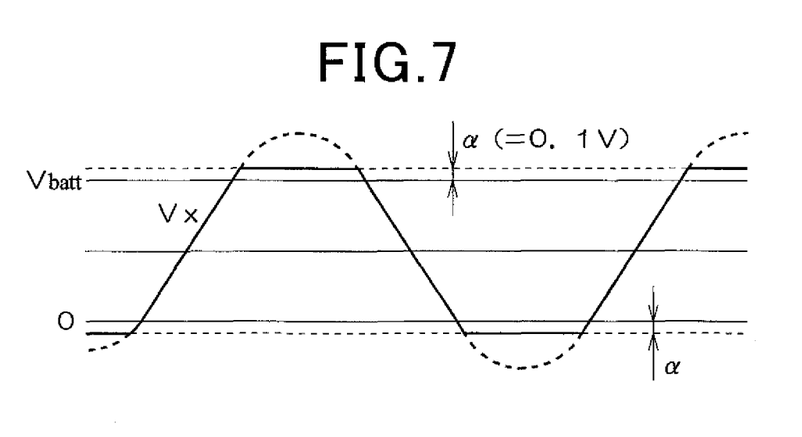
FIG. 7 is a view showing a phase voltage in the alternator according to the exemplary embodiment of the present invention.

FIG. 6 is a view showing a transition state from a time when the load dump occurs to a time when the usual rectifying operation is executed. FIG. 7 is a view showing the change of the phase voltage in the alternator 1 according to the exemplary embodiment.

In the transition state shown in FIG. 6, the rectifying state S1 indicates the rectifying operation when no load dump occurs. In the following explanation, the terminal voltage of the battery 9 is designated by reference character $V_{batt}$ and a voltage between the source terminal and the drain terminal of each of the MOS transistors 50 and 51 when the MOS transistors 50 and 51 are turned on simultaneously is designated by reference character a, as shown in FIG. 7. For example, in the usual condition where no load dump occurs, the is synchronous rectifying operation is executed as follows. The MOS transistor 50 in the high voltage side is turned on when the phase voltage Vx of the X phase winding exceeds the voltage "$V_{batt}+\alpha$". On the other hand, the MOS transistor 51 in the low voltage side is turned on when the phase voltage Vx of the X phase winding becomes less than the voltage "$-\alpha$".

The rectifying operation previously described makes it possible to adjust the output voltage VB of the alternator 1 to the adjustment voltage $V_{reg}$ (for example, 14.5 V). The first threshold voltage V1 judgment section 143 compares the output voltage VB of the alternator 1 with the first threshold voltage V1 while the synchronous rectifying operation is executed as designated by reference character S2 in FIG. 6.

In the situation previously described, when the output terminal of the alternator 1 is disconnected from the charging line 12, the load dump occurs, in which each phase voltage of the stator windings 2 and 3 of the alternator 1 is temporarily increased. Because the output voltage VB of the alternator 1 becomes more than the first threshold voltage V1 when the load dump occurs, the first threshold voltage V1 judgment section 143 generates and outputs the high voltage level signal in order to start to execute the load dump protection operation. When receiving the high voltage level signal transmitted from the first threshold voltage V1 judgment section 143, the control section 100 instructs the driver 170 to turn off the MOS transistor 50 in the high voltage side (upper arm), and instructs the driver 172 to turn on the MOS transistor 51 in the low voltage side (lower arm), as designated by reference character S3 shown in FIG. 6.

By the way, there is a time delay Tr counted from a time when the output signal of the first threshold voltage V1 judgment section 143 is switched to a high voltage level from a low voltage level to a time when the control section 100 instructs the driver 172 to turn on the MOS transistor 50.

Figure 8:
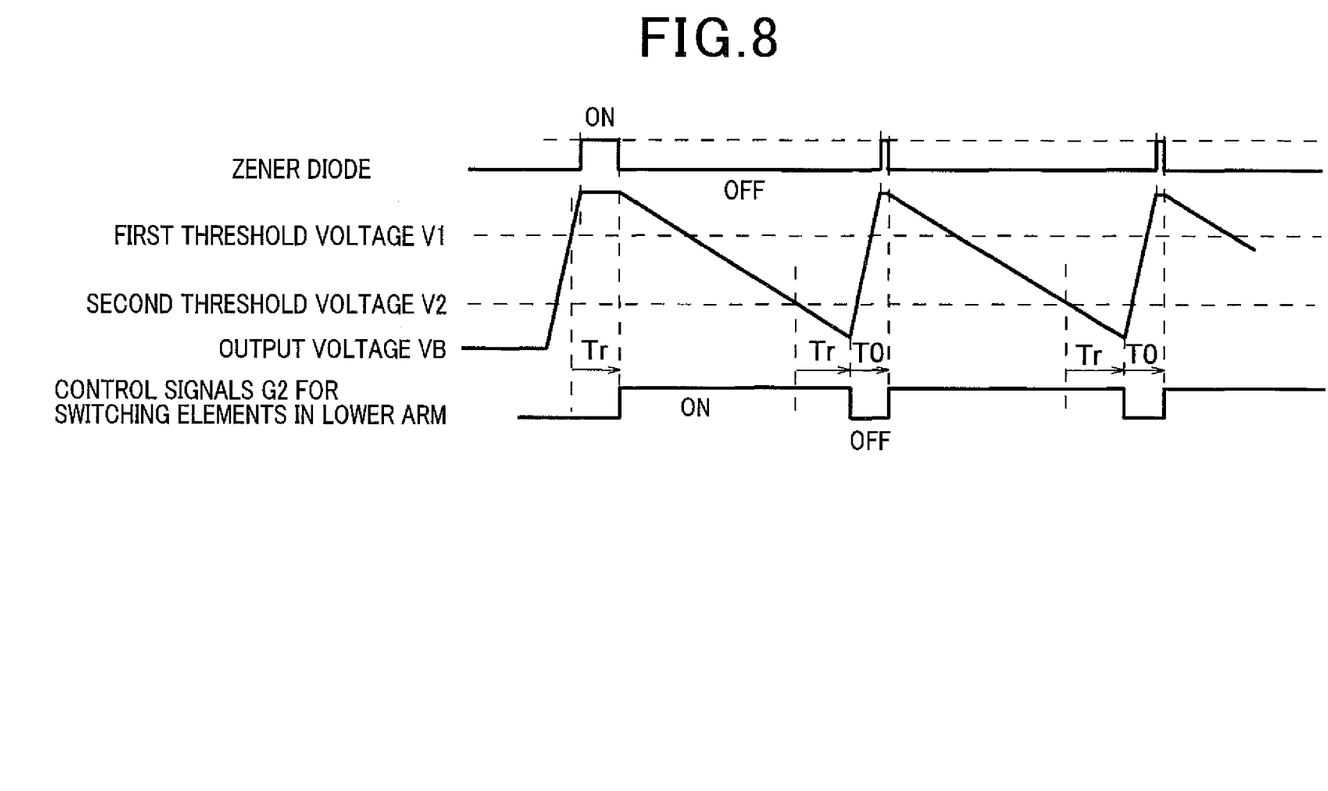
FIG. 8 is a view showing a timing chart of the load dump protection operation executed by the control circuit when a load dump occurs.

FIG. 8 is a view showing a timing chart of the load dump protection operation executed by the control section 100 when the load dump occurs. FIG. 8 shows the time delay Tr (at the first occurrence), as previously described. Accordingly, the MOS transistor 50 is turned off and the MOS transistor 51 is turned on after the elapse of the delay time Tr counted from the time when the output of the first threshold voltage V1 judgment section 143 is switched to a high voltage level.

Because the output voltage VB of the alternator 1 is further increased until the time when the MOS transistor 51 is turned on, because the Zener diode 20 is connected to the output terminal of the alternator 1, the output voltage VB of the alternator 1 is maintained when the output voltage VB of the alternator 1 reaches the Zener voltage of the Zener diode 20. In more detail, the output voltage VB of the alternator 1 is maintained when the voltage, which is calculated by subtracting the forward voltage of the diode 22 from the output voltage VB of the alternator 1, reaches the Zener voltage of the diode 20. This maintained output voltage of the alternator 1 is designated by reference character "ON" in the Zener diode shown in FIG. 8.

After the MOS transistor 51 in the low voltage side (lower arm) is turned on, the output voltage VB of the alternator 1 is decreased. In this situation, the second threshold voltage V2 judgment section 144 compares the output voltage Vb with the second threshold voltage V2 (see the state S4 shown in FIG. 6). When the detection result indicates that the output voltage VB of the alternator 1 becomes less than the second threshold voltage V2, the second threshold voltage V2 judgment section 144 outputs the comparison result to the signal generation section 147.

When receiving the comparison result transmitted from the second threshold voltage V2 judgment section 144, the signal generation section 147 generates and output the pulse signal which has a high voltage level during the predetermined time length.

When receiving the pulse signal transmitted from the signal generation section 147, the control section 100 instructs the driver 172 to turn off the MOS transistor 51 in the low voltage side (lower arm) during the predetermined time length designated by the received pulse signal, and instructs the driver 172 to turn on the MOS transistor in the low voltage side (lower arm) after the elapse of the predetermined time length (see the state S5 shown in FIG. 6).

By the way, there is a time delay Tr counted from a time when the signal generation section 147 outputs the pulse signal to a time when the control section 100 instructs the driver 172 to turn on the MOS transistor 51 after the control section 100 instructs the driver 172 to turn off the MOS transistor 51. FIG. 8 shows the time delay Tr (at the second occurrence), However, it is possible that the time delay Tr (at the first occurrence) is different from the time delay Tr (at the second occurrence in FIG. 8).

In addition, the predetermined time length in which the MOS transistor 51 is turned off is designated by reference character T0. After the elapse of the predetermined time length T0, the third threshold voltage V3 judgment section 145 compares the output voltage VB of the alternator 1 immediately after the elapse of the predetermined time length T0 with the third threshold voltage V3 (see the state S6 shown in FIG. 6).

Because a current flows through the diode arranged in parallel to the MOS transistor 51 when the MOS transistor 51 is turned off in the low voltage side (lower arm) (at this time the MOS transistor 51 in the high voltage side (upper arm) is turned off) until the energy accumulated in the stator is consumed when the load dump occurs, the output voltage of the alternator 1 increases. In this situation, the output voltage VB of the alternator 1 immediately after the MOS transistor 51 is turned off during the predetermined time length T0, the load dump protection operation is continued.

On the other hand, when the energy stored in the stator when the load dump occurs is consumed, because the output voltage VB immediately after the MOS transistor 51 is turned off during the predetermined tie length T0 becomes lower than the third threshold voltage V3, the usual rectifying operation is returned.

A description will now be given of the predetermined time length in which the MOS transistor in the lower voltage side is turned off.

In the exemplary embodiment, the signal generation section 147 adjusts the predetermined time length during which the MOS transistor 51 is turned off on the basis of the output voltage VB of the alternator 1 immediately after the MOS transistor 51 low voltage side (lower arm) is turned off during the predetermined time length. This makes it possible to adjust the optimum time length in order to correctly turn off the MOS transistor 51 in the low voltage side (lower arm) on the basis of the amount of the increased output voltage VB during the load dump. In this case, the minimum value of the predetermined time length is smaller than the predetermined time delay Tr. This makes it possible to quickly turn on the MOS transistor 51 and to prevent the output voltage VB from being increased by delaying the time when the MOS transistor 51 is turned on when compared with a case in which the MOS transistor 51 in the low voltage side (lower arm) is turned on after the output voltage VB of the alternator 1 is detected. Specifically, the signal generation section 147 determined the predetermined time length by the following methods (a), (b) and (c). (a) Immediately after the MOS transistor 51 in the low voltage side (lower arm) is turned off during the predetermined time length, when the output voltage VB of the alternator 1 is not less than the first threshold voltage V1, the predetermined time length T0 is set to a value which is shorter than the time delay Tr (see FIG. 8). This makes it possible to quickly turn on the MOS transistor 51 in the low voltage side (lower arm) when compared with the case in which the MOS transistor 51 in the low voltage side (lower arm) is turned on after detecting that the output voltage VB of the alternator 1 exceeds the first threshold voltage V1. This makes it possible to prevent the output voltage VB of the alternator 1 from increasing by the time delay to turn on the MOS transistor 51 in the low voltage side (lower arm).

Figure 9:
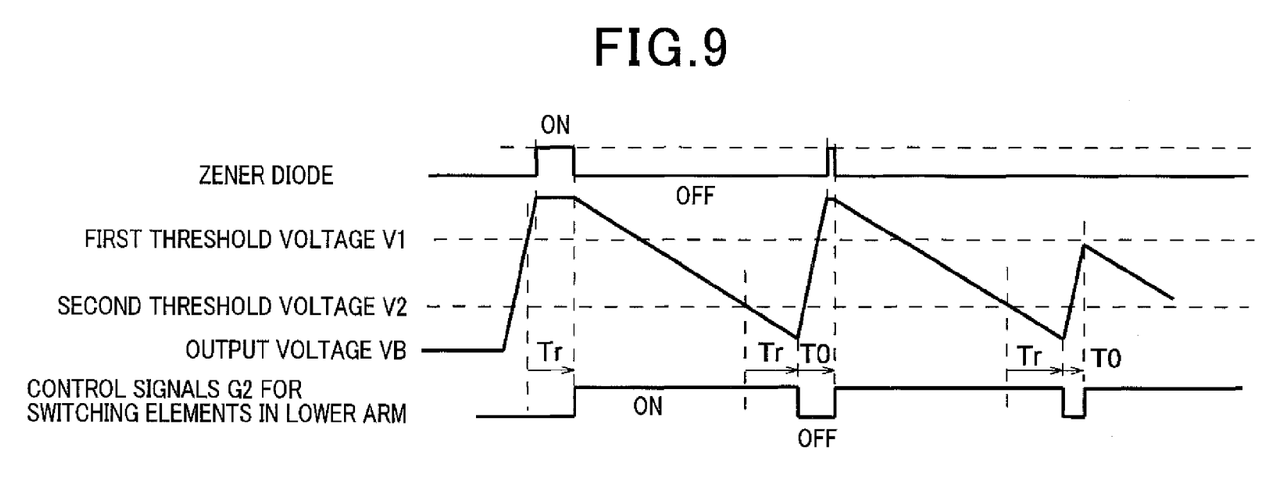
FIG. 9 is a view showing another timing chart of the load dump protection operation executed by the control circuit in the alternator according to the first exemplary embodiment when a load dump occurs.

FIG. 9 is a view showing another timing chart of the load dump protection operation executed by the control section 100 in the alternator 1 according to the first exemplary embodiment when a load dump occurs.

(2) Immediately after the MOS transistor 51 in the low voltage side (lower arm) is turned off during the predetermined time length, when the output voltage VB of the alternator 1 is not less than the first threshold voltage V1, the predetermined time length T0 is set to a value of not more than a half of the predetermined time length T0 previously used (see FIG. 9). In particular, the predetermined time length T0 has a lower limit value. When the output voltage VB of the alternator 1 is less than the lower limit value of the predetermined time length T0, the lower limit value is used as the predetermined time length T0. This makes it possible to detect the timing when the MOS transistor 51 in the low voltage side (lower arm) is turned on again and to forward this timing. As a result it is possible to prevent the output voltage VB of the alternator 1 from increasing by delaying the time when the MOS transistor 51 in the low voltage side (lower arm) is turned on.

Figure 10:
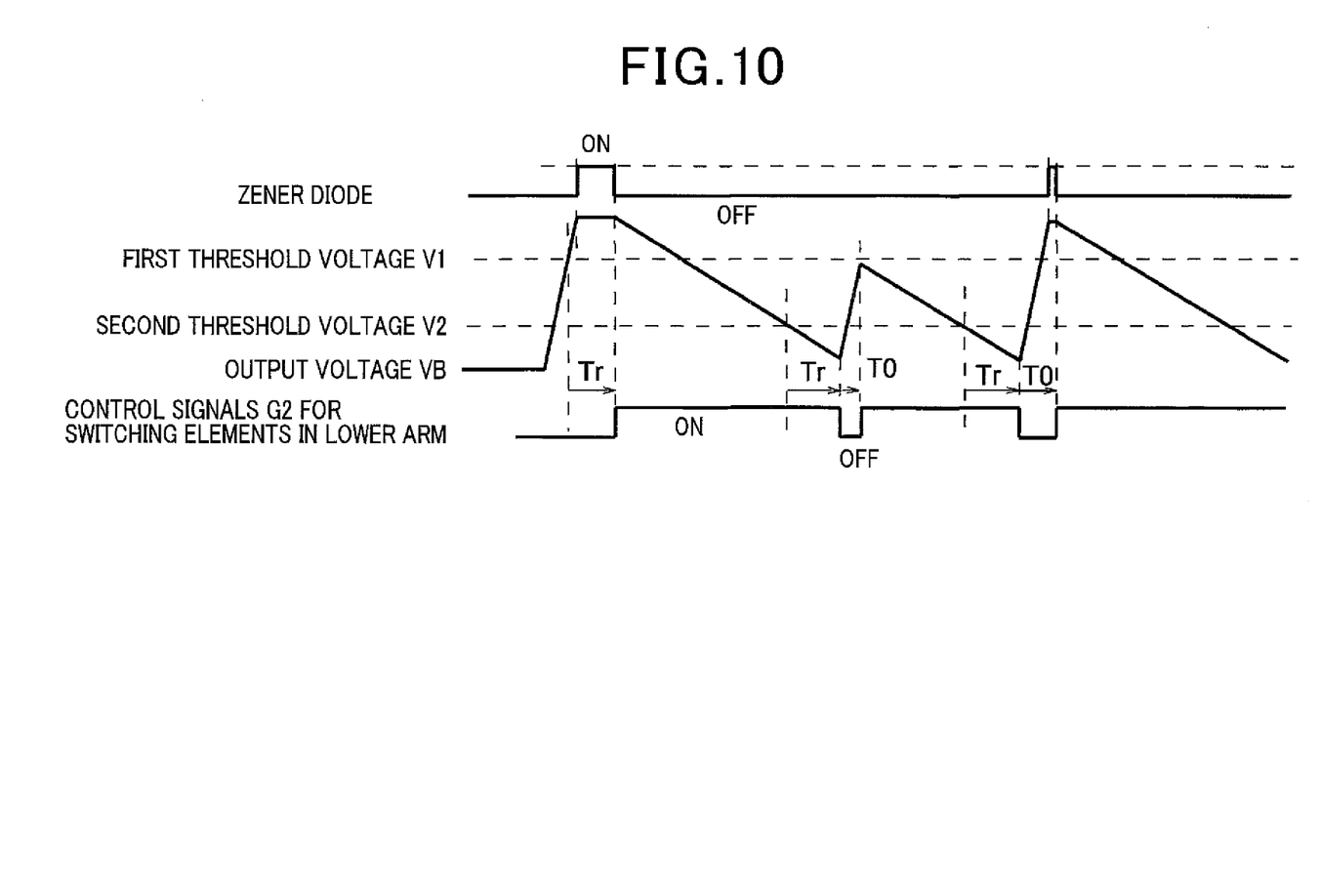
FIG. 10 is a view showing another timing chart of the load dump protection operation executed by the control circuit in the alternator according to the first exemplary embodiment when a load dump occurs.

FIG. 10 is a view showing another timing chart of the load dump protection operation executed by the control section 100 in the alternator 1 according to the exemplary embodiment when a load dump occurs.

(3) Immediately after the MOS transistor 51 in the low voltage side (lower arm) is turned off during the predetermined time length, when the output voltage VB of the alternator 1 is within a range between the first threshold voltage V1 and the second threshold voltage V2, the predetermined time length T0 is set to a value which is twice of the predetermined time length T0 previously described (see FIG. 10). When the timing when the MOS transistor 51 in the low voltage side (lower arm) is turned on again is too advanced, it is possible to delay this timing. This makes it possible to obtain an adequate time length in which the MOS transistor 51 in the low voltage side (lower arm) is turned off, and to adequately suppress the increase of the output voltage VB of the alternator 1.

It is possible to select one of the method (1) and the method (2) previously described, and to combine the method (3) with one of the method (1) and the method (2).

As previously described in detail, the alternator 1 according to the exemplary embodiment uses the predetermined time length in order to turn off the MOS transistor 51 in the low voltage side (lower arm) when the output voltage VB of the alternator 1 becomes less than the second threshold voltage V2 after the load dump protection operation is executed when the output voltage VB of the alternator 1 exceeds the first threshold voltage V1. Accordingly, it is possible to suppress the output voltage VB from increasing again and keep it as low as possible while the MOS transistor 51 is turned off. It is further possible to quickly complete the generation of a high voltage at the output terminal B of the alternator 1 the high-voltage occurrence when a load dump phenomenon occurs.

This makes it possible to provide a high reliability of the alternator 1 because of preventing a high voltage from being supplied to the MOS transistors 50 and 51 and the field control section 7 for a long time period. In particular, it is possible to reliably decrease a high voltage generated at the output terminal B of the alternator 1 when the load dump occurs by repeatedly turning on the MOS transistor 51 in the low voltage side (lower arm).

In addition, because the load dump protection operation is completed at the time when the output voltage VB of the alternator 1 becomes less than the third threshold voltage V3 immediately after the MOS transistor 51 in the low voltage side (lower arm) is turned off during the predetermined time length, it is possible to complete the load dump protection operation at an optimum timing when the energy stored in the stator is consumed. In particular, when the third threshold voltage V3 is equal to the second threshold voltage V2, i.e. the control section 100 uses the second threshold voltage V2 as the third threshold voltage V3, because the third threshold voltage V3 judgment section 145 and the second threshold voltage V2 judgment section 144 have the same structure, it is accordingly possible for the alternator 1 according to the exemplary embodiment to have a simple structure.

Further, because the Zener diode 20 has a Zener voltage which is lower than a withstand voltage of the MOS transistor 50, etc., and is connected in parallel to the rectifying module groups 5 and 6, it is possible for the Zener diode 20 to receive an excess output voltage of the alternator 1, and this makes it possible to suppress a temperature of the MOS transistor 50, etc. from increasing by generated heat energy. In particular, because the diode 22 is connected in series to the Zener diode 20 in order to prevent a current flowing when the battery 9 is reversely connected to the alternator 1, it is possible to prevent a larger current flowing through the Zener diode 20 when the battery 9 is reversely connected to the alternator 1.

Still further, because the Zener diode 30 has a Zener voltage which is lower than a withstand voltage of the MOS transistor 50, etc., and is connected to the terminal P of the field control section 7, it is possible to reliably prevent a high voltage supplied from the phase winding of the stator winding to the field control section 7 when a load dump occurs.

The concept of the present invention is not limited by the exemplary embodiment previously described. It is possible for the alternator 1 to have various modifications. For example, the alternator 1 according to the exemplary embodiment previously described has the two stator windings 2 and 3 and the two rectifying module groups 5 and 6. However, it is possible to apply the concept of the alternator 1 to an alternator comprised of one stator winding 2 and one rectifying module group 5.

Still further, the previous description explains the case in which each of the rectifying modules 5X, 5Y, 5Z, . . . executes a rectifying operation (or an electric power generation operation). However, the concept of the present invention is not limited by this structure. It is possible to convert a direct current of the battery 9 to an alternating current and supply the converted alternating current to the stator windings 2 and 3 in order to execute the alternator 1.

The alternator 1 according to the exemplary embodiment has the structure previously described in which each of the rectifying module groups 5 and 6 is comprised of the three rectifying modules. However, the concept of the present invention is not limited by this structure. It is possible for each of the rectifying module groups 5 and 6 to have plural rectifying modules other than three rectifying modules.

The alternator 1 according to the exemplary embodiment has the structure previously described in which the load dump protection judgment circuit 140 shown in FIG. 5 is provided to each of the rectifying modules. In this structure, it is possible to have one terminal B voltage detection section 141 and one threshold voltage judgment section 142 which are commonly used by the rectifying module groups 5 and 6. Still further, it is possible to have a control device capable of controlling the synchronous rectifying operation of all of the rectifying modules, instead of the structure in which each rectifying module executes the synchronous rectifying operation of the corresponding phase winding.

The alternator 1 according to the exemplary embodiment has the structure previously described in which each of the upper arm (high voltage side) and the lower arm (the low voltage side) in the bridge circuit is comprised of the MOS transistors. However, the concept of the present invention is not limited by this structure. It is possible for the lower arm of the bridge circuit to have the MOS transistors and for the upper arm to have diodes.

Figure 11:
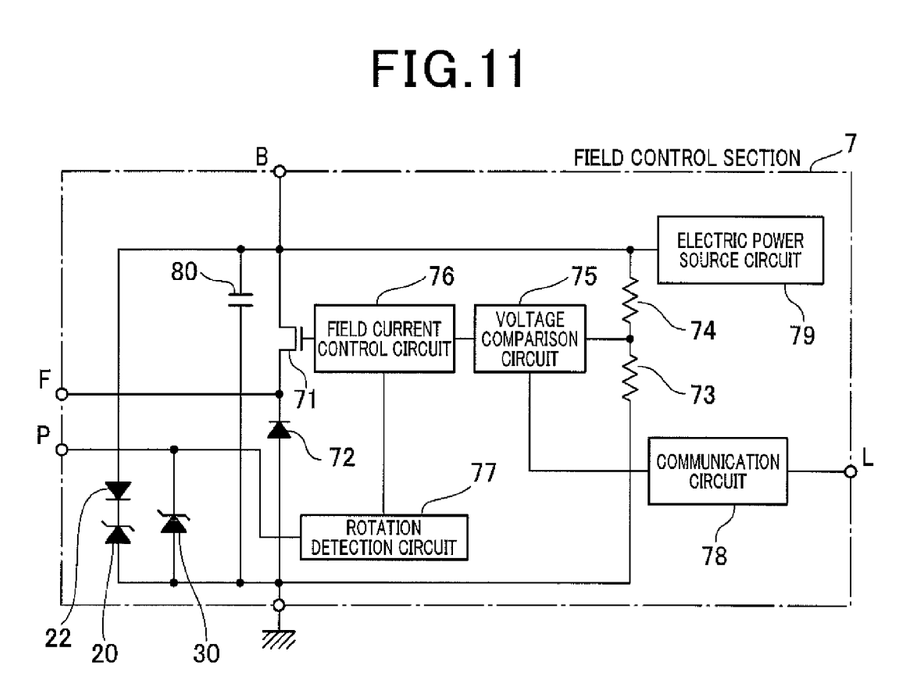
FIG. 11 is a view showing a modification of the field control section in the alternator according to the exemplary embodiment of the present invention.

FIG. 11 is a view showing a modification of the field control section 7 in the alternator 1 according to the exemplary embodiment. The alternator 1 according to the exemplary embodiment has the structure previously described in which the Zener diode 20 and the diode 22 are arranged externally from the field control section 7. However, the concept of the present invention is not limited by this structure. As shown in FIG. 11, it is possible to arrange the Zener diodes 20 and 30 and the diode 22 or at least one of them in the inside of the field control section 7. This structure makes it possible to form the Zener diodes 20 and 30 and the diode 22 in the inside of the field control section 7 as an integrated circuit.

That is, it is possible for the alternator 1 to have a simple structure because of it being unnecessary to arrange, as a single part, each of the Zener diodes 20 and 30 and the diode 22.

Still further, the alternator 1 according to the exemplary embodiment has the structure previously described in which the capacitor 80 is arranged in the inside of the field control section 7. However, the concept of the present invention is not limited by this structure. It is possible to form the capacitor 80 at the outside of the field control section 7.

(Industrial Applicability)

As previously described in detail, according to the exemplary embodiment of the present invention, the control section 100 uses the predetermined time length during which the MOS transistor in the low voltage side (lower arm) is turned off when the output voltage VB of the alternator 1 becomes not more than the second threshold voltage V2 after the load dump protection operation is executed when the output voltage VB of the alternator 1 exceeds the first threshold voltage V1. Further, the control section 100 in the control circuit 54 in each of the rectifying module adjusts the predetermined time length to an optimum value in order to suppress any increase of the output voltage of the alternator 1 while the switching element is turned off. This makes it possible to promptly prevent the high-voltage generation at the output terminal B of the alternator 1 when a load dump occurs.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. An electric rotary machine comprising:
   armature windings having not less than two phase windings;
   switching sections comprising a bridge circuit, the bridge circuit comprising an upper arm and a lower arm, the lower arm comprising switching elements, each of the switching elements in the lower arm being connected in parallel to a diode, and the switching sections configured to receive and rectify a voltage induced by the armature windings; and
   a capacitor connected in parallel to an output terminal of the switching sections,
   wherein the switching sections comprise:
   a control section configured to control a turn-on operation and a turn-off operation of each of the switching elements; and
   a load dump protection judgment section configured to executes a load dump protection operation by monitoring an output voltage of the switching sections, instructing the control section to turn on the switching elements in the lower arm at a time when a predetermined delay time has elapsed from when the monitored output voltage of the switching sections exceeds a first threshold voltage, and instructing the control section to turn on the switching elements in the lower arm after the switching elements in the lower arm are turned off during a predetermined time length, when the monitored output voltage of the switching sections becomes less than a second threshold voltage after the monitored output voltage of the switching sections exceeds the first threshold voltage.

2. The electric rotary machine according to claim 1, wherein the load dump protection judgment section monitors the output voltage of the switching sections after instructing the control section to turn on the switching elements after the switching elements in the lower arm are turned off during the predetermined time length, and the load dump protection judgment section instructs the control section to turn on the switching elements in the lower arm after the switching elements are turned off during the predetermined time length when the monitored output voltage of the switching sections becomes less than the second threshold voltage.

3. The electric rotary machine according to claim 1, wherein the load dump protection judgment section adjusts the predetermined time length on the basis of the monitored output voltage of the switching sections immediately after the switching elements are turned off during the predetermined time length.

4. The electric rotary machine according to claim 3, wherein the load dump protection judgment section decreases the predetermined time length to a value of not more than the predetermined delay time when the monitored output voltage of the switching sections becomes not less than the first threshold voltage immediately after the switching elements are turned off during the predetermined time length.

5. The electric rotary machine according to claim 3, wherein the load dump protection judgment section decreases the predetermined time length to a value of not more than a half of the predetermined time length previously used when the monitored output voltage of the switching sections becomes not less than the first threshold voltage immediately after the switching elements is turned off during the predetermined time length, and the load dump protection judgment section uses a predetermined lower limit value when the decreased predetermined time length becomes less than the predetermined lower limit value.

6. The electric rotary machine according to claim 3, wherein the load dump protection judgment section increases the predetermined time length to a value of not less than a twice of the predetermined time length previously used when the monitored output voltage of the switching sections is within a range between the first threshold voltage and the second threshold voltage immediately after the switching elements are turned off during the predetermined time length.

7. The electric rotary machine according to claim 3, wherein a minimum value of the predetermined time length is shorter than the predetermined delay time.

8. The electric rotary machine according to claim 1, wherein the load dump protection judgment section completes the execution of the load dump protection operation when the monitored output voltage of the switching sections becomes less than a third threshold voltage immediately after the switching elements are turned off during the predetermined time length wherein the third threshold voltage is less than the first threshold voltage and not less than the second threshold voltage.

9. The electric rotary machine according to claim 8, wherein the third threshold voltage is equal to the second threshold voltage.

10. The electric rotary machine according to claim 1, further comprising a first Zener diode arranged in parallel to the output of the switching sections, wherein a withstand voltage of the Zener diode is smaller than a withstand voltage of each of the switching elements.

11. The electric rotary machine according to claim 10, wherein the first Zener diode is connected in series to a current limiting element capable of limiting a current flowing when the battery is connected reversely to the output terminal of the switching sections.

12. The electric rotary machine according to claim 10, further comprising a field control section configured to adjust a field current to be supplied to the field winding on the basis of the monitored output voltage of the switching sections, wherein the capacitor and the first Zener diode are arranged in the field control section.

13. The electric rotary machine according to claim 1, further comprising:
 a field control section configured to adjust a field current to be supplied to the field winding on the basis of the monitored output voltage of the switching sections; and
 a second Zener diode having a Zener voltage which is lower than a withstand voltage of the switching elements and a withstand voltage of the field control section, and connected in parallel to the switching elements in the lower arm corresponding to the phase winding connected to the field control section.

* * * * *